Aug. 14, 1956　　　F. A. PURDY　　　2,758,836
DOOR-OPERATORS
Filed May 31, 1952　　　　　　　　　　14 Sheets-Sheet 1
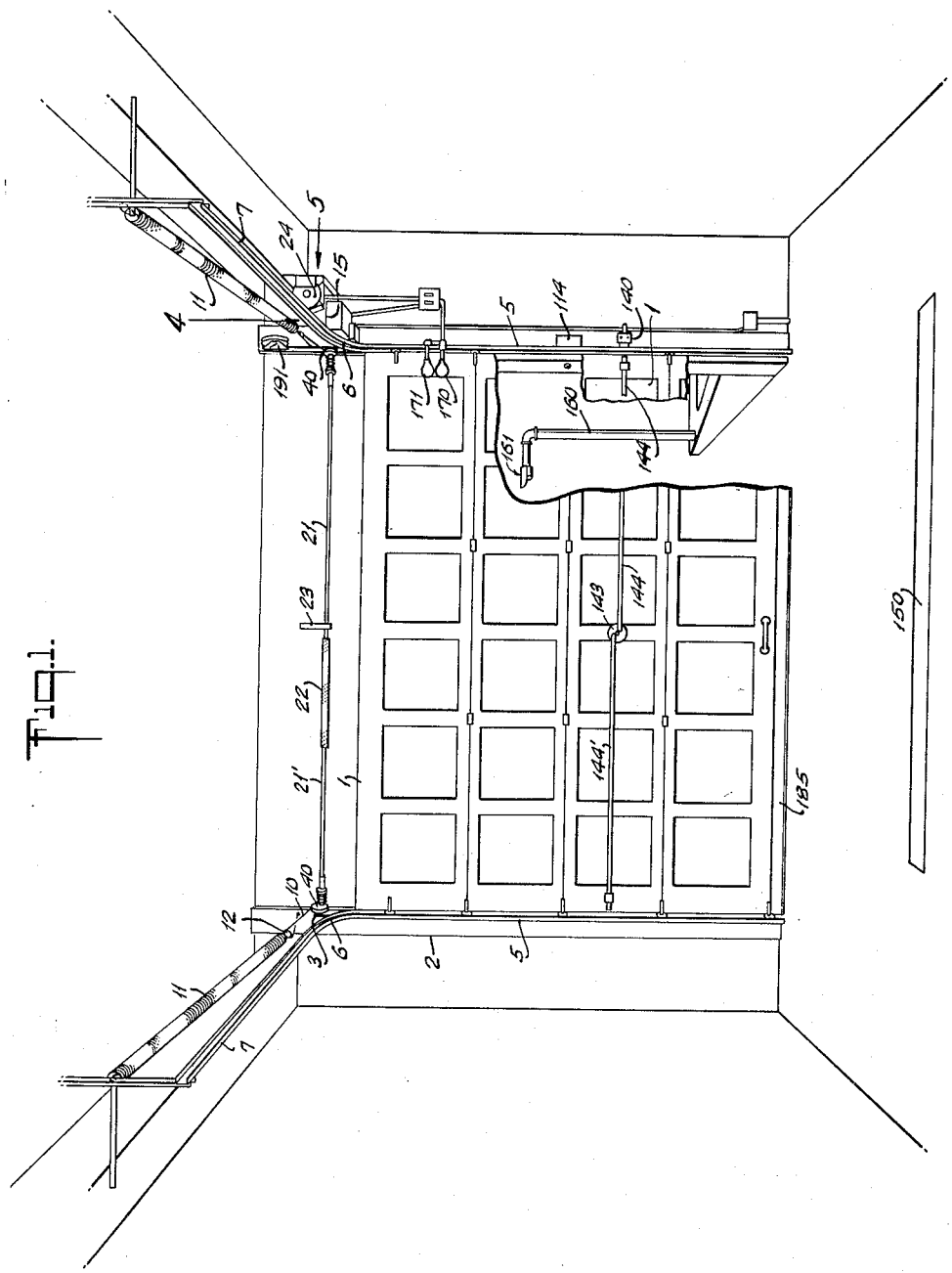
INVENTOR.

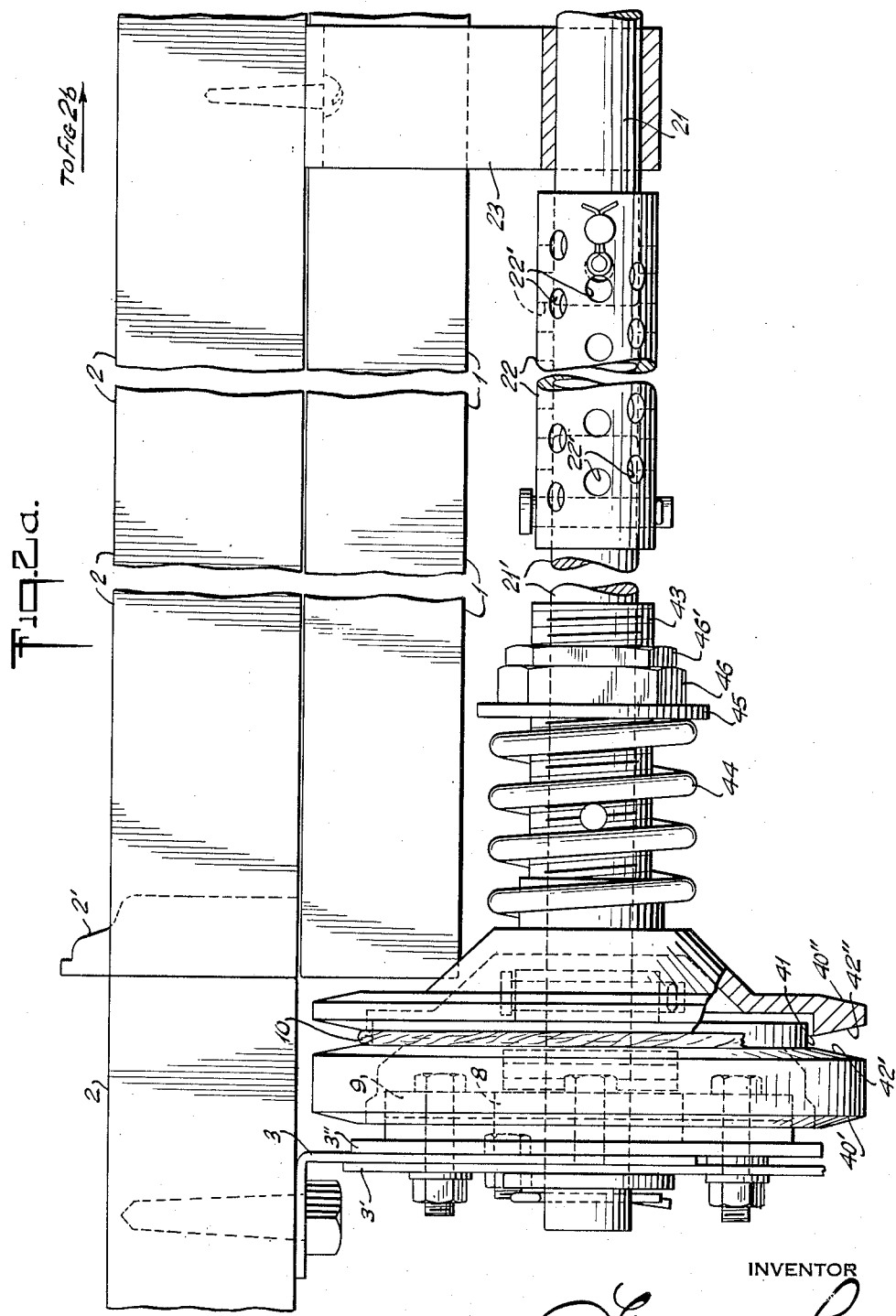

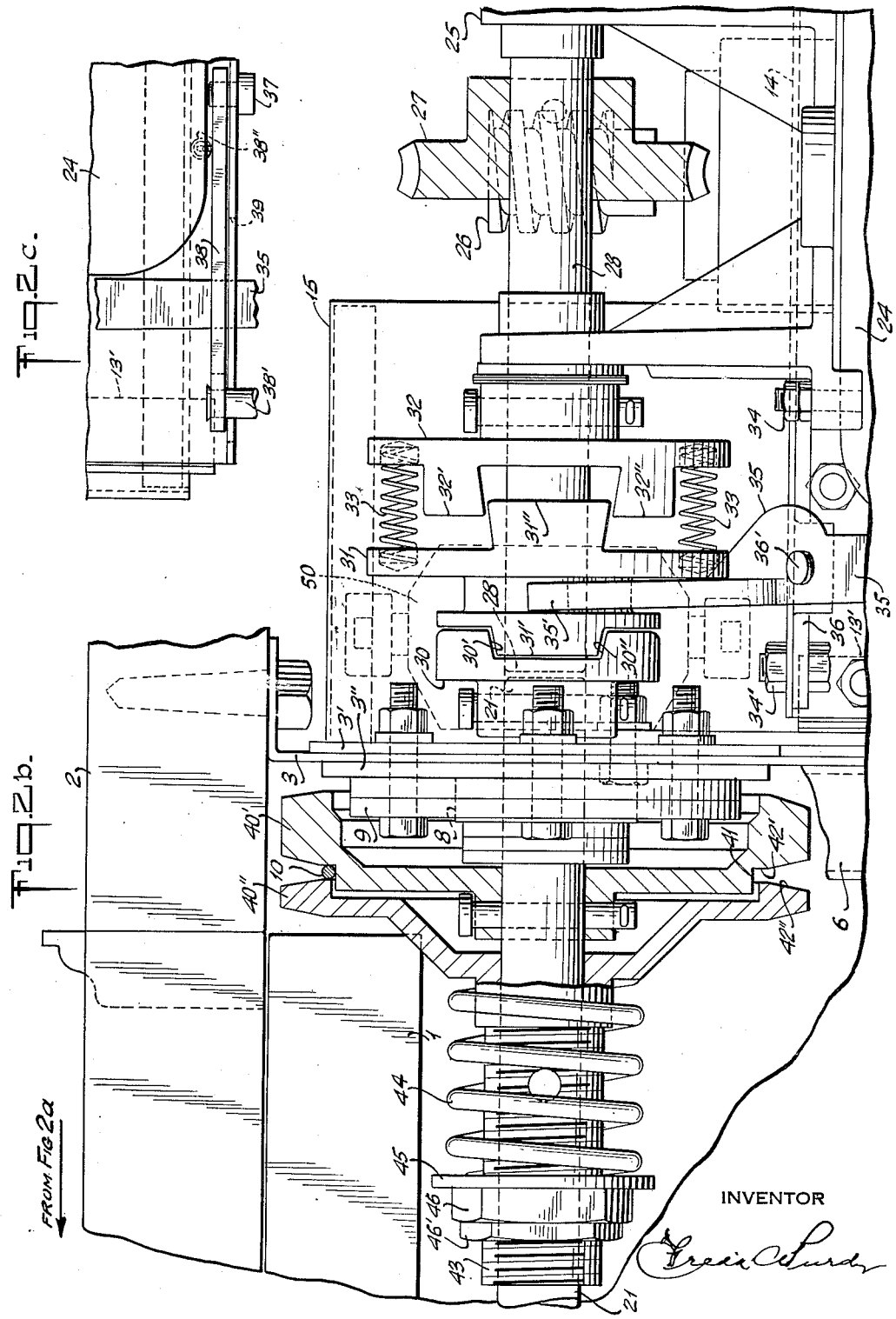

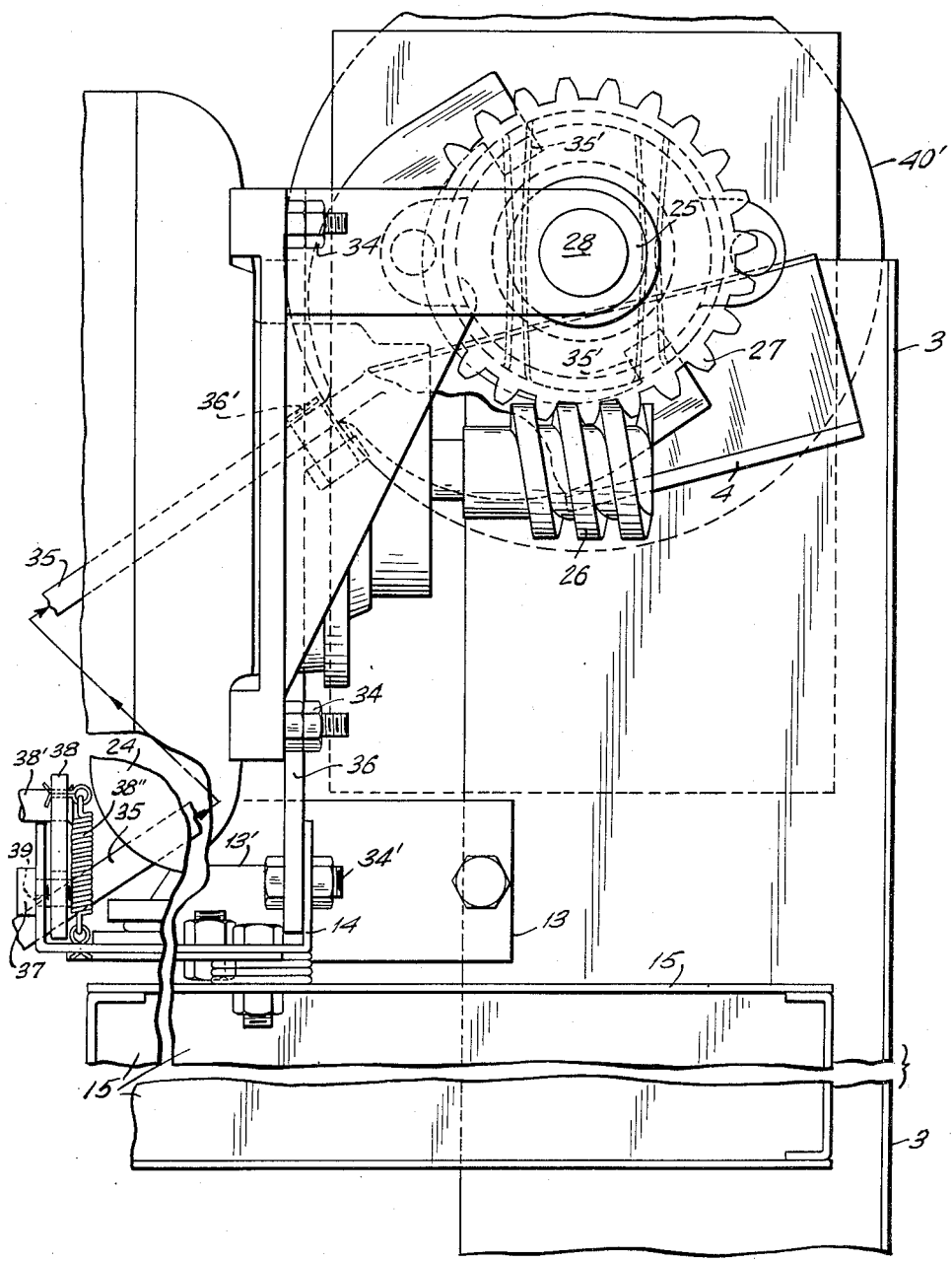

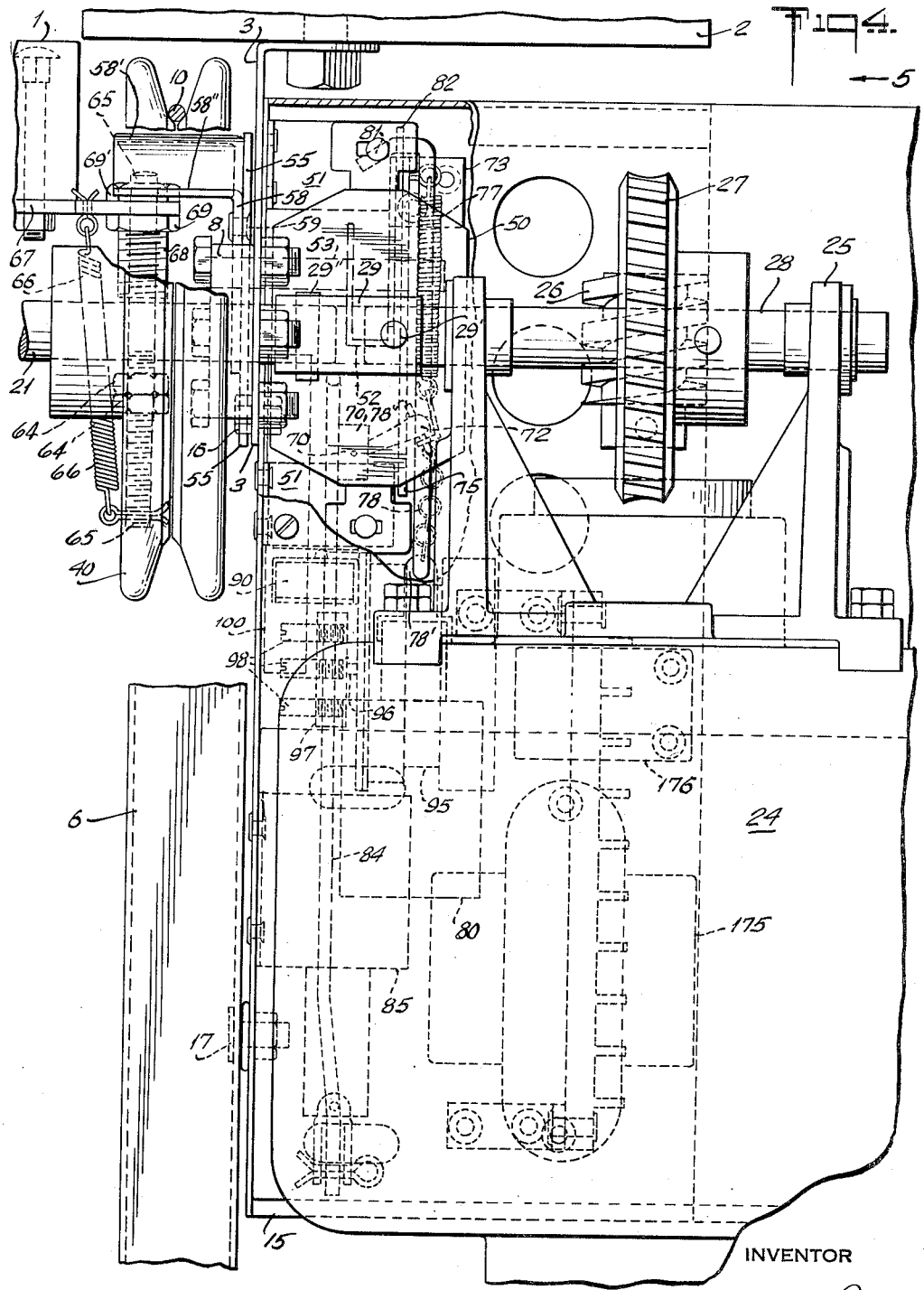

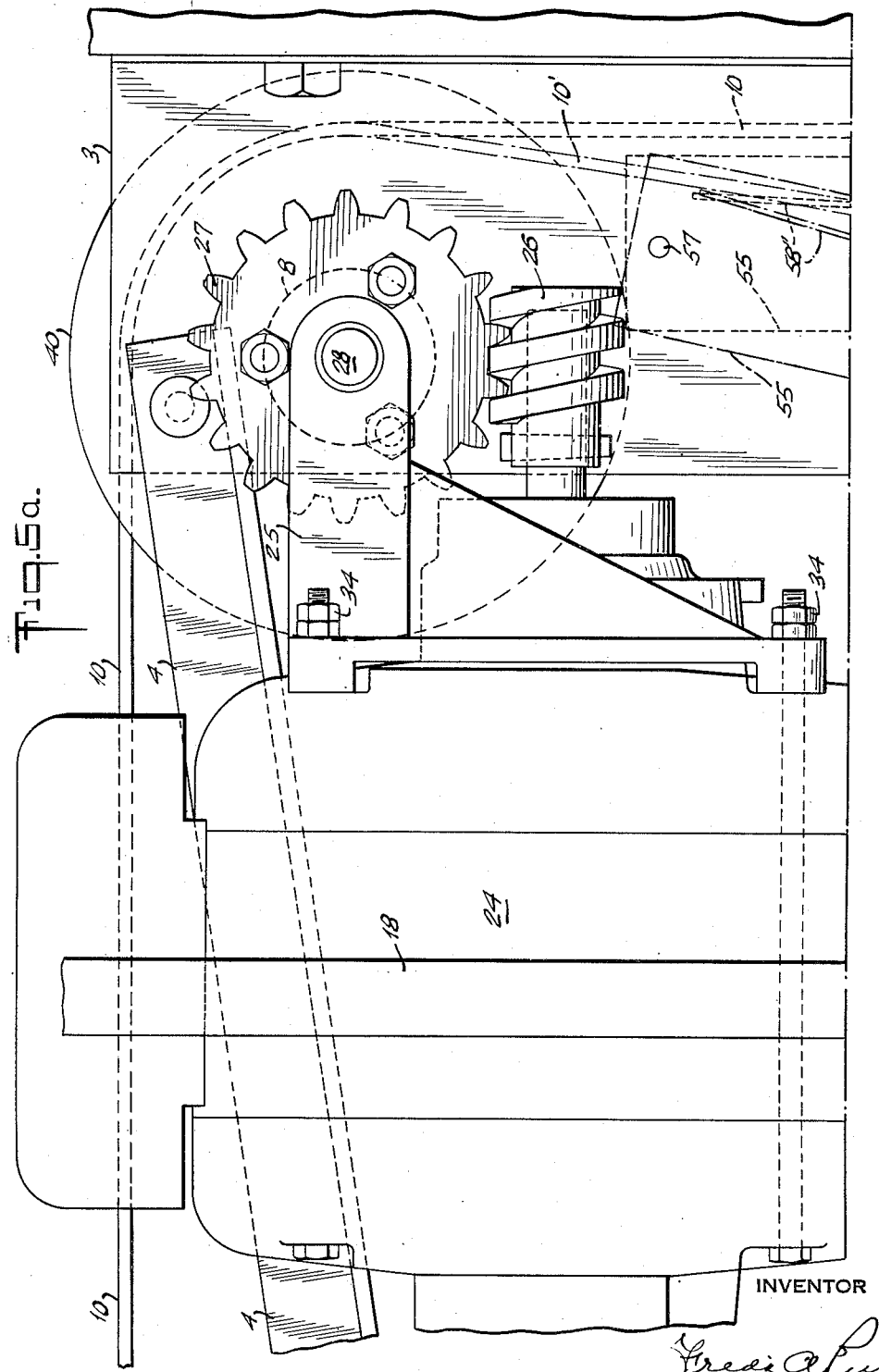

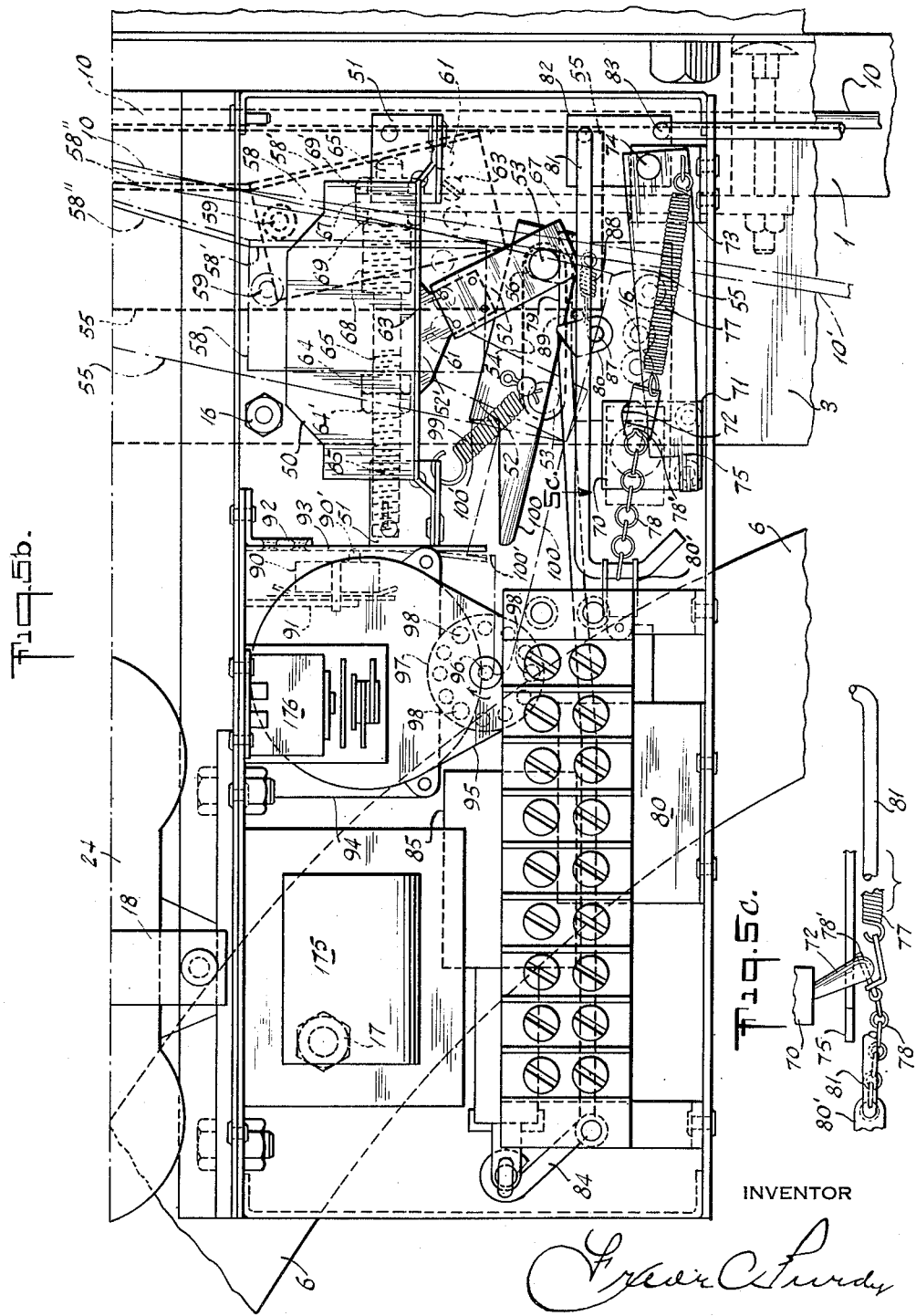

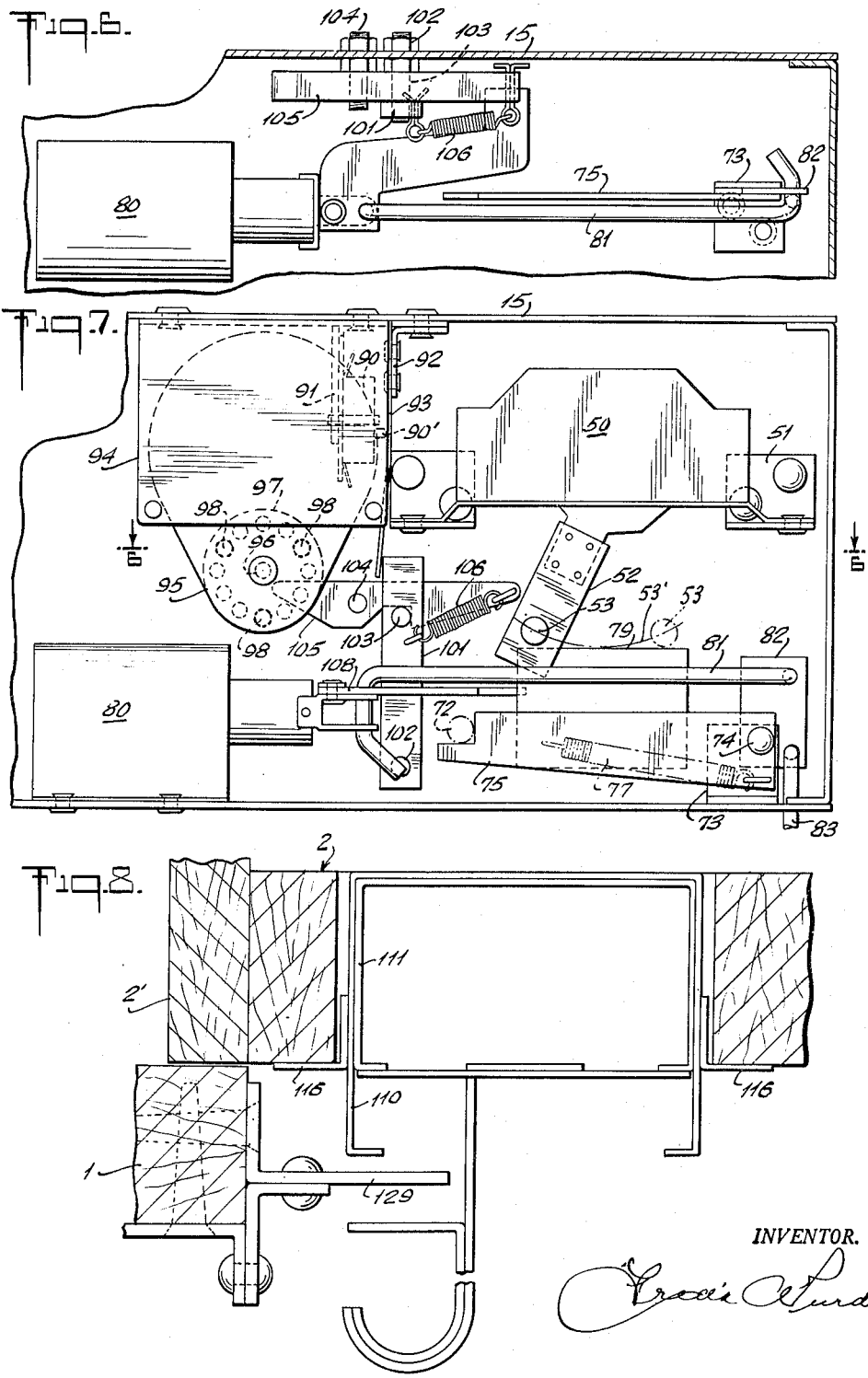

Aug. 14, 1956  F. A. PURDY  2,758,836
DOOR-OPERATORS
Filed May 31, 1952  14 Sheets-Sheet 9
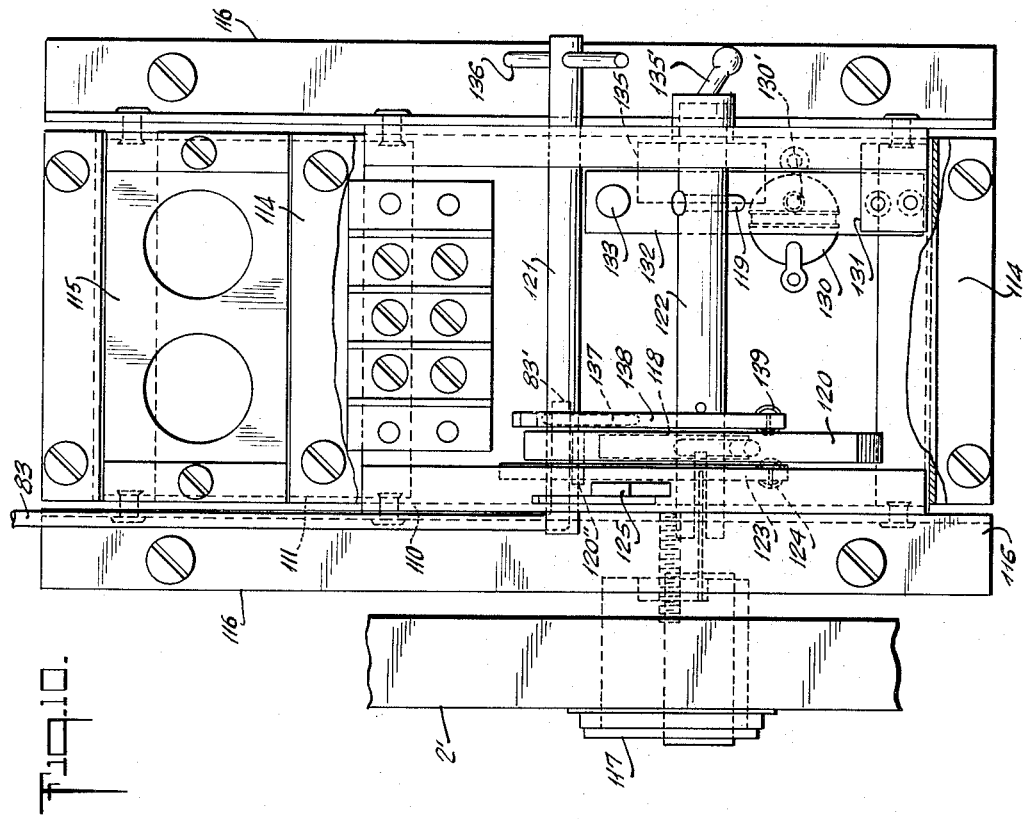
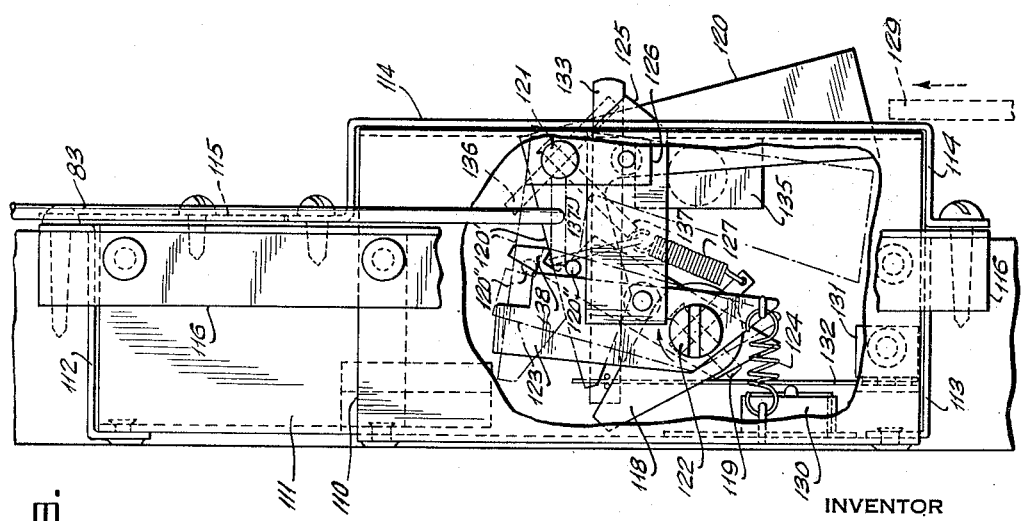
INVENTOR Aug. 14, 1956　　　F. A. PURDY　　　2,758,836
DOOR-OPERATORS
Filed May 31, 1952　　　14 Sheets-Sheet 10
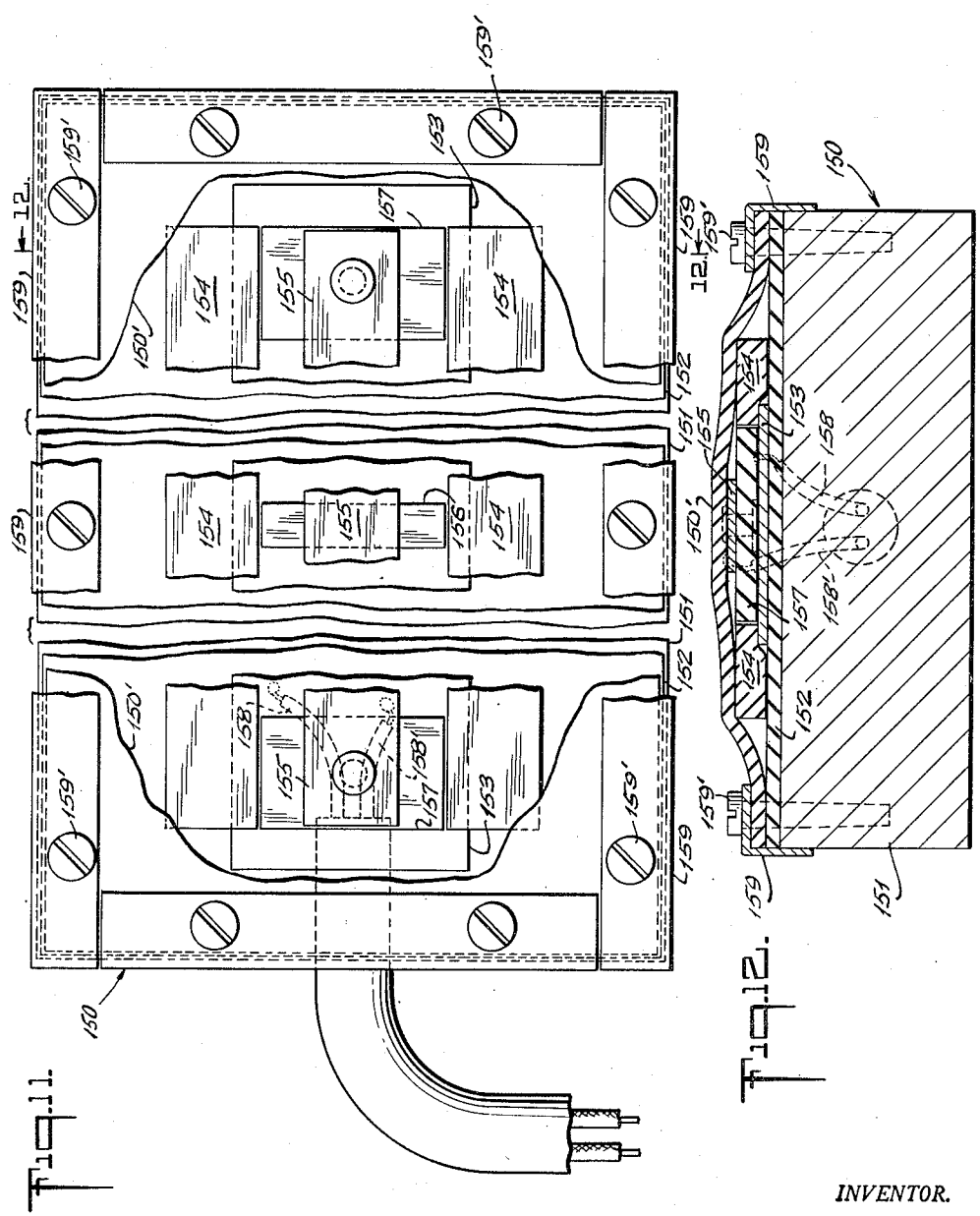
INVENTOR.
Fred A. Purdy

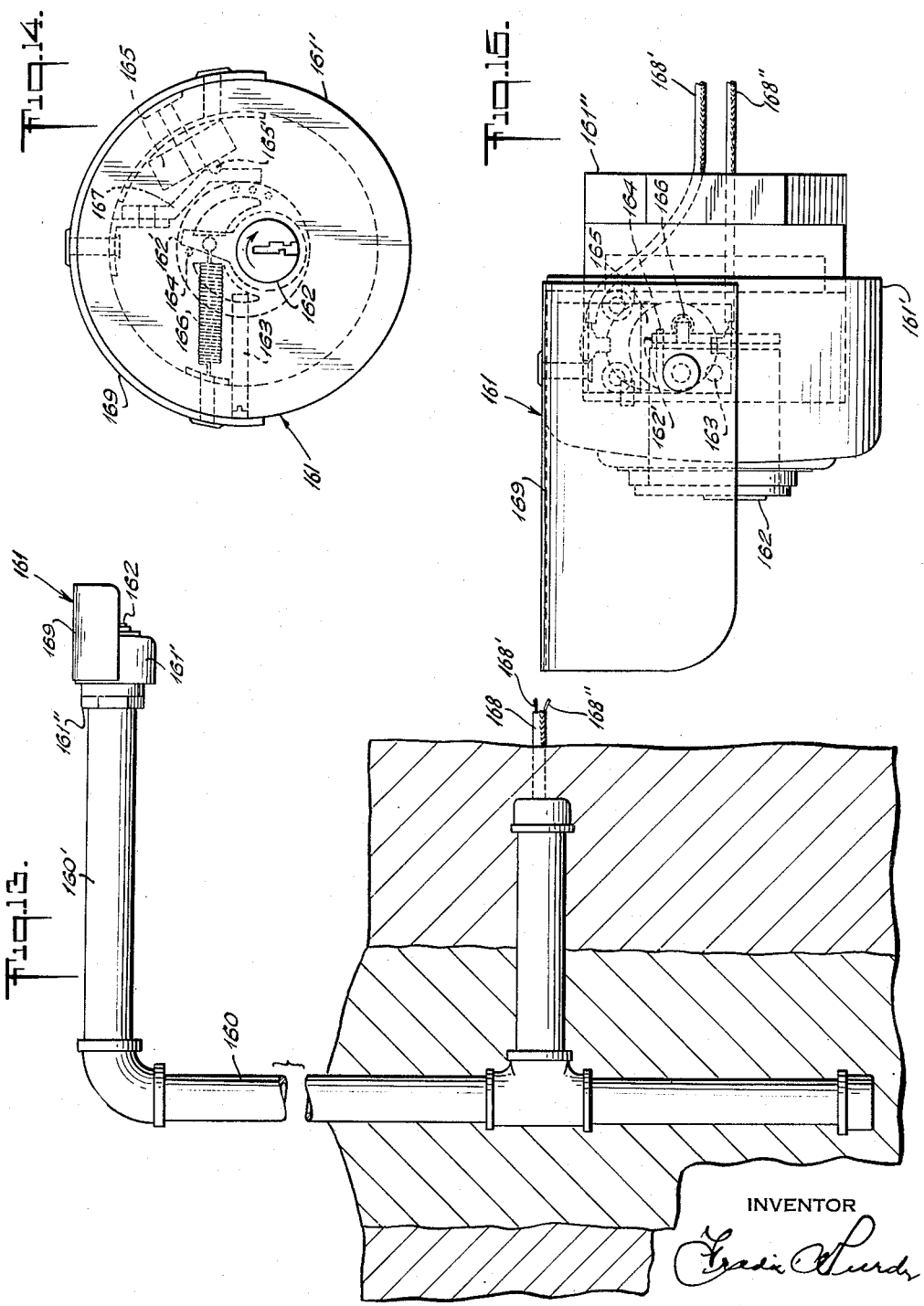

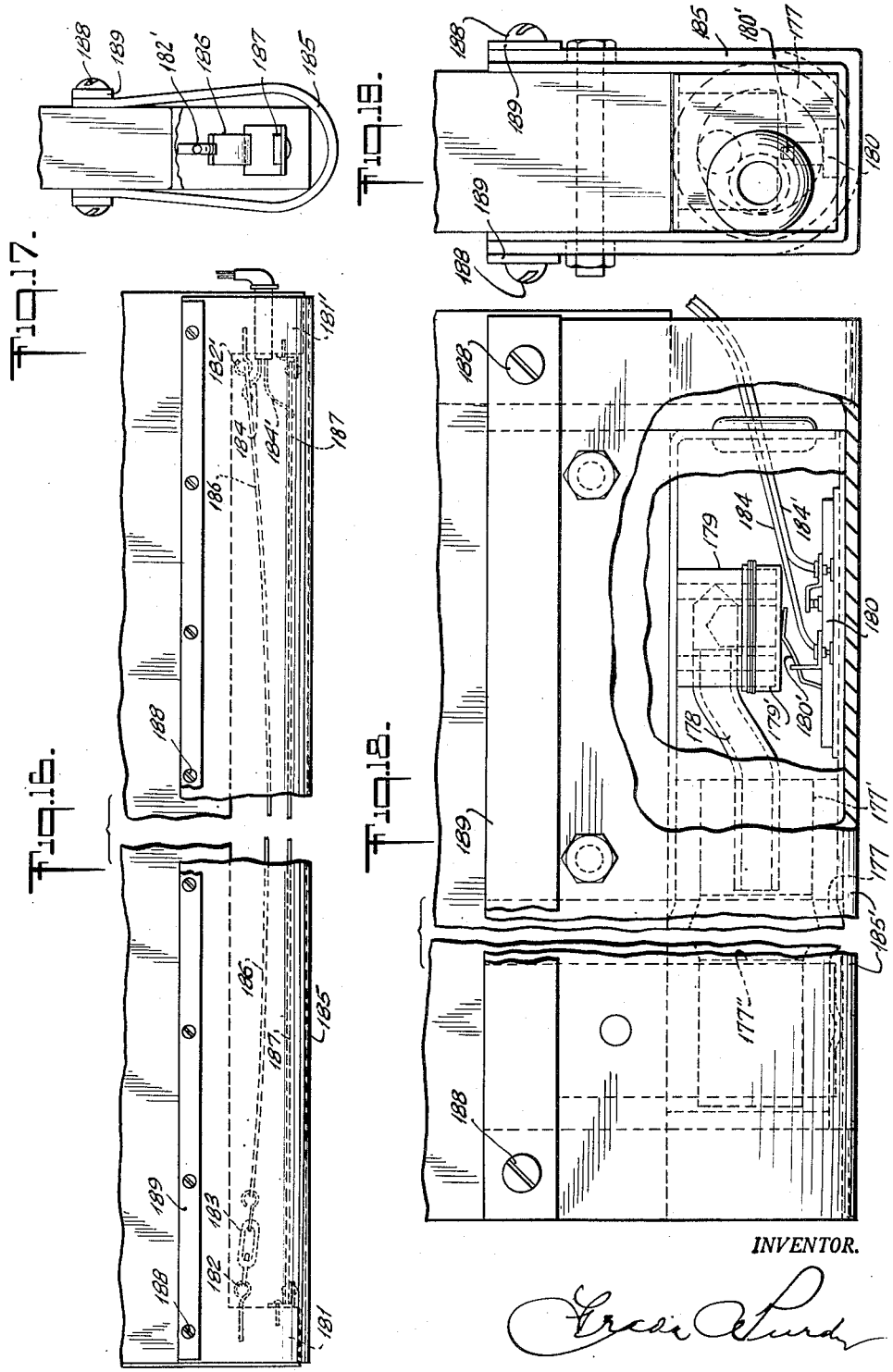

Aug. 14, 1956     F. A. PURDY     2,758,836
DOOR-OPERATORS
Filed May 31, 1952     14 Sheets-Sheet 13
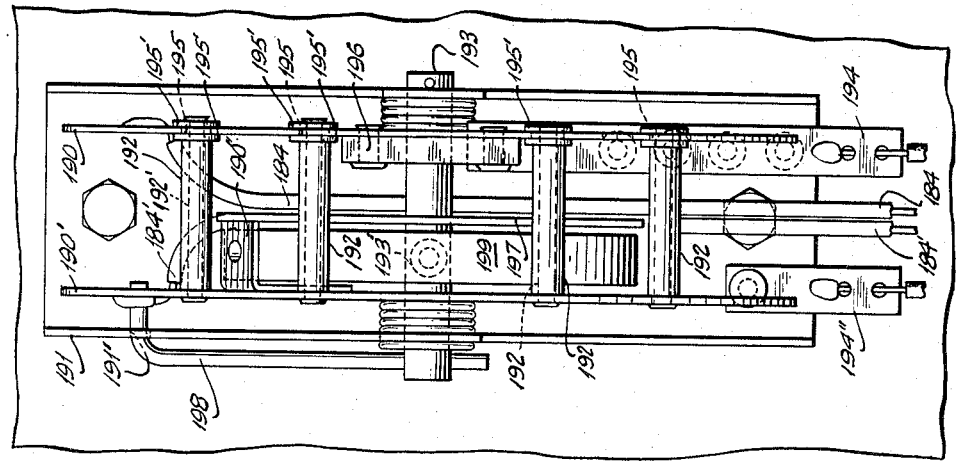
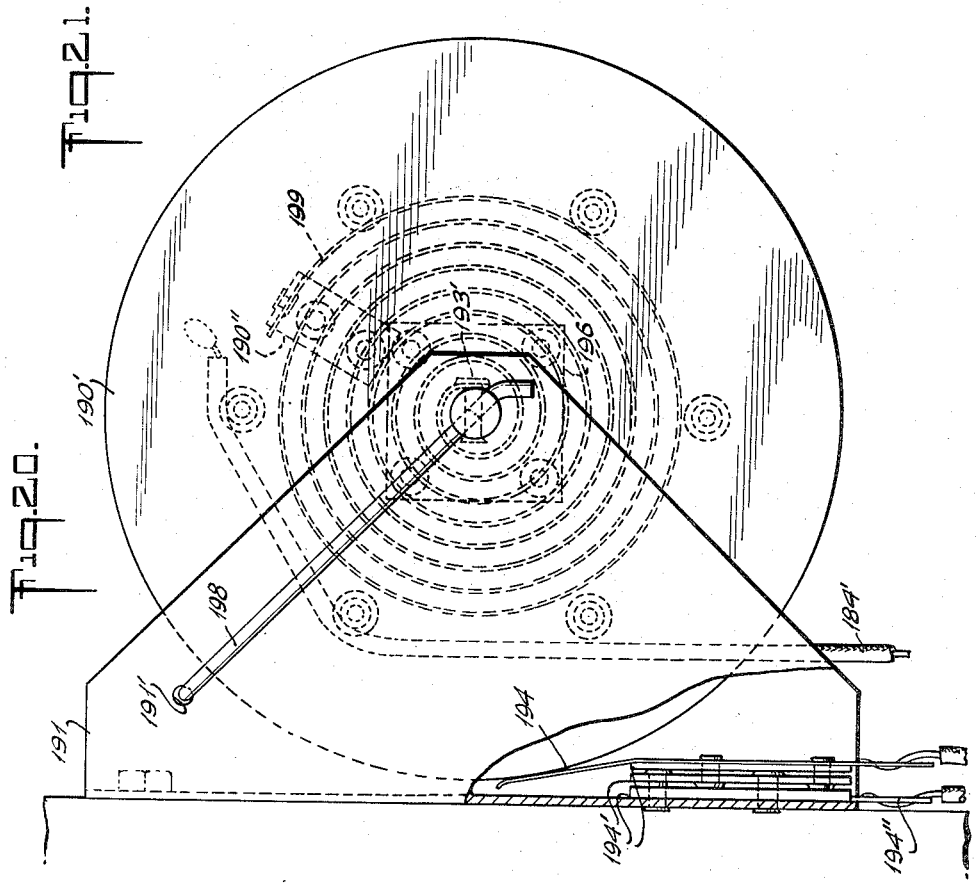
INVENTOR

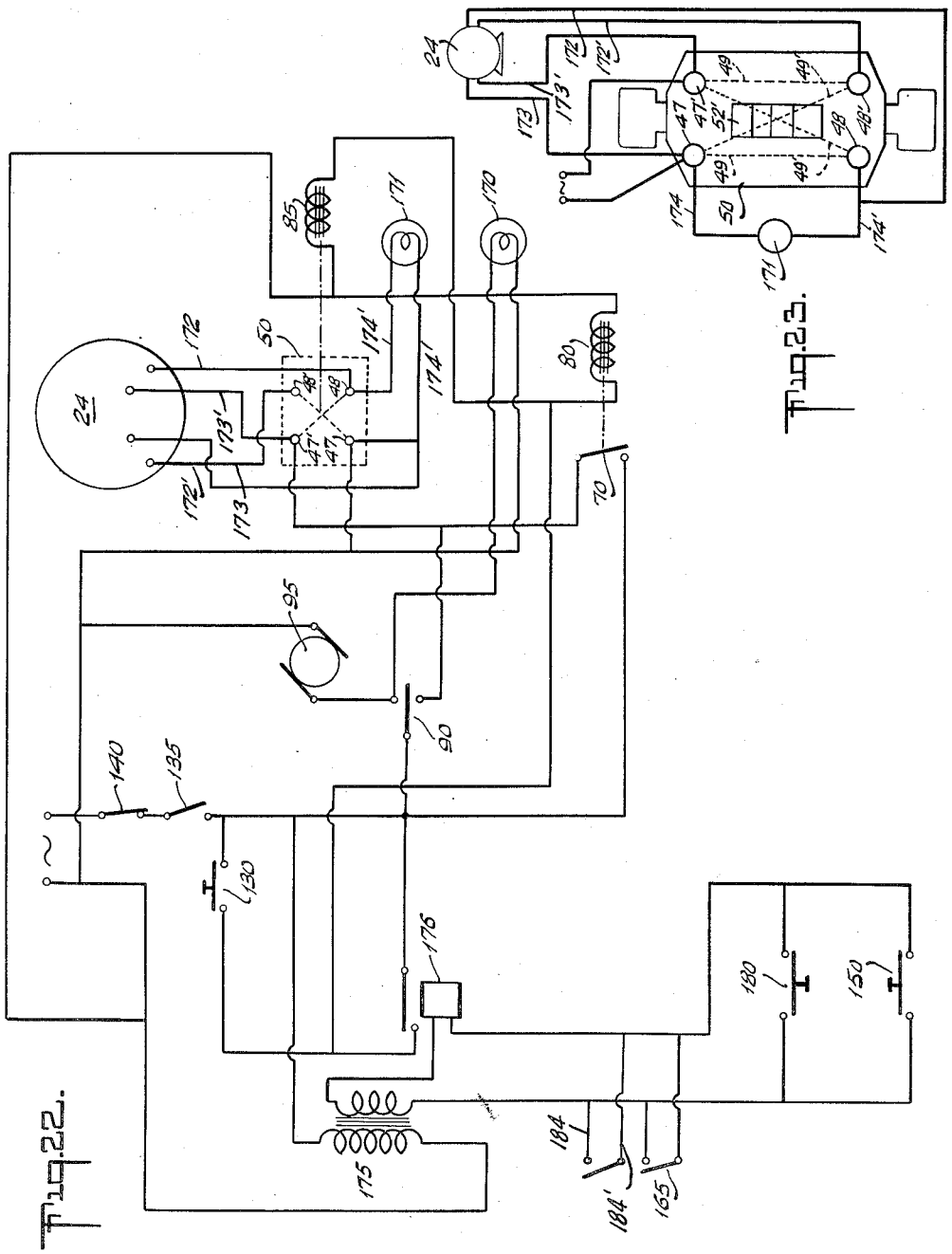

United States Patent Office 2,758,836
Patented Aug. 14, 1956

2,758,836

DOOR-OPERATORS

Frederick A. Purdy, Scarsdale, N. Y.

Application May 31, 1952, Serial No. 290,859

18 Claims. (Cl. 268—59)

This invention relates to door-operators, and has particular reference to devices for opening, closing, and controlling the operation of, doors of garages at apartment-houses and residences, and doors of similar building-structures.

Objects of the invention are economy in manufacture and in installation, simplicity in design, and dependability in use. Other objects willl become apparent in the development of the description.

The instant mechanism is an improvement over the devices disclosed in my prior Patents 2,062,015 issued November 24, 1936, and 2,127,376 issued August 16, 1938, and is an improvement upon or an alternative to the devices described in my pending applications, Serial Numbers 139,081, 139,082 filed January 17, 1950, and Serial Number 225,751 filed May 11, 1951, now Patents 2,689,724, 2,689,725 and 2,689,726, respectively, dated September 21, 1954.

Drawings

A preferred form of the invention is illustrated in the accompanying drawings in which—

Figure 1 is a perspective view of a garage-doorway as at an apartment house and of approaches thereto, showing the door in closed position cut away to show a post and lock-switch outside, showing a tire-contact in the floor inside, and showing positions of lamps, locks, tracks, shafts, reel, and of motor and controls;

Figure 2a is a top view of drive-shaft as at the left and middle of Figure 1, also showing a cable-sheave and the relative positions of door frame, and door;

Figure 2b is a top view of drive-shaft as at the right of Figure 1, also showing a cable sheave, a clutch, and part of the worm and worm-wheel supported from motor frame;

Figure 2c is a fragmentary extension of Figure 2b showing latch for clutch-handle;

Figure 3 is a view endwise of drive-shaft showing worm and worm-wheel supported from motor frame, also clutch-fork and part of motor-pan and its supports, with control-box suspended below it;

Figure 4 is a top view taken in the direction of the arrow 4 of Figure 1, showing the door closed in full lines, also the motor, worm, worm-wheel, shaft, an alternative sheave used without clutch, and a plan outline of parts within the control-box below the motor;

Figures 5a and 5b are endwise views taken in the direction of the arrow 5 of Figures 1 and 5, Figure 5a showing the motor, worm and worm wheel, and Figure 5b showing a side view of a control box and the devices within it; Figure 5c is a fragmentary plan view taken in the direction of the arrow 5c of Figure 5b;

Figure 6 is a top view and Figure 7 a side view of parts within the control box alternatively used for timer cut-out of solenoids;

Figure 8 is a top view, showing positions of frame, door, and track in relation to an automatic lock;

Figure 9 is a side view and Figure 10 a face view of the automatic lock;

Figure 11 is a top view and Figure 12 a sectional view taken on line 12—12 of Figure 11, showing a tire-contact used in the floor of the approachway to door;

Figure 13 is a side view of post used outdoors for lock-switch;

Figure 14 is a face view, and Figure 15 a side view of the lock-switch;

Figure 16 is a face-view and Figure 17 an end view of a safety sleeve on bottom of door;

Figure 18 is a face view and Figure 19 an end view of an alternative safety sleeve on bottom of door;

Figure 20 is a side view and Figure 21 an end view of a reel for controlling slack electric cord;

Figure 22 is a wiring diagram showing electric connections of all parts;

Figure 23 is a wiring diagram of a reversing switch.

General observation

This invention is shown as applied to a door 1, Figure 1, which opens from a vertical position into a horizontal position overhead, guided by rollers in vertical and horizontal tracks 5 and 7, respectively, either side of doorway, that are joined by a curved section 6.

A horizontal shaft 21 above the doorway, carried on vertically extending brackets 3 attached to frame 2 either side of doorway, supports a sheave-wheel 40 at either side. Each sheave 40 carries a cable 10 from bottom end of door to a sheave 12 on counterbalancing spring 11. The motor-drive turns shaft 21 in one direction to open the door, and in the opposite direction to close the door. A reversing switch 50, Figures 4 and 5b, changes the direction of rotation of the motor. A power-switch 70 sets the motor into operation. The power-switch is thrown by a solenoid 80 energized by "house-current." The circuit of house-current to the solenoid may be closed by any means of remote control, as by radio-waves, by sound-waves, by a lock-switch on a post beside the driveway, or by a tire-contact.

A tire-contact 150, Figures 1, 11, and 12, consists of two strips of metal within rubber mats, normally separated, pressed together by the automobile-tire momentarily close a low voltage circuit from transformer 175 to relay 176 so as to energize solenoid 80.

A key operated lock-switch 165 on post 160 similarly closes a parallel circuit to energize the relay and solenoid 80.

A sleeve of rubber 185 looped along bottom edge of door encloses metal strips which close a circuit a parallel relay circuit when a door, moving toward closed position, comes into contact with a car or other object to energize a solenoid 85 to throw the reversing switch 50 and retract the door upward.

Locks, "stop" and "go" lights, and other features, are described in detail as the description progresses.

For the purposes of this description, the term "forward" is defined as the direction from within the garage toward the wall of the garage in which is the doorway; the term "rearward" is defined as the direction from within the garage toward the wall of garage that is opposite the doorway. The terms "set off" and "setting off" are defined as meaning to initiate movement, putting specified parts into action. The "closing-edge" of a door is the edge of an overhead door which, in closed position of the door, comes into contact with sill of doorway; or the edge of a hinged door that is opposite from the edge to which hinges are attached.

Door-drive

A bracket 3 (Figures 2a and 2b) with supplementary plates 3' and 3" welded to it, is fastened to doorway frame 2, one either side of doorway. It supports the top end of vertical track 5, Figure 1, and the lower end of curved section 6, Figures 4 and 5b. The forward end of the horizontal track 7, with the upper end of curved section 6, is held by strut 4, Figure 3 or Figure 5a, which attaches to bracket 3. A ball-bearing 8 is carried in pocket 9, mounted on each bracket 3. These two ball-bearings support the shaft 21. The shaft is in three parts 21, 21' and 22, 22 being an adapter-coupling between 21 and 21'. The shaft is supported midway against sagging by bracket 23, Figure 2a, fastened to lintel of doorway. Adjoining each bracket 3 is a sheave-wheel 40, fastened to shaft 21 or 21', over which runs cable 10 from its attachment at bottom of door 1 to sheave 12 on counterbalancing spring 11, Figure 1.

Adapter-coupling 22 is detailed in Figure 2a. This is a pipe that embraces the ends of shafts 21 and 21', and is pinned to these shafts. Holes 22' for the pins are drilled through the walls of the pipe at spirally spaced intervals, one series of such holes at each end of the pipe preferably two feet from the other, and one series, not shown, midway of these. Holes for the pins are drilled also through the ends of shafts 21 and 21'. The one-foot separations of the series permit of adaptations of the shafts and coupling to doorways of varying widths, as 8 feet, or 9 feet, or 10 feet, or as 15 feet, 16 feet, or 17 feet. The spacings within the spirals permit of adaptations to variations in the distance at which the brackets 3 may be positioned from the edges of the door, so that the operator may be installed upon hardware of differing makes, and so that allowance may be made in the length of the shaft for inaccuracies in the positioning of brackets 3. The length of shaft 21 and of shaft 21' approximates that required for the average practice in the positioning of brackets 3. The intervals of holes 22' within spiral spacing around coupling 22 permit of putting the pin through coupling 22 and shaft 21 or shaft 21' so as to adapt the length of the whole three-piece shaft to the distance between brackets 3. If the spiral holes in coupling 22 were spaced at ⅛" intervals along the shaft, the shaft could be fitted in relation to brackets 3 within an accuracy of ⅛" or less. By having two holes in the end of shaft 21, spaced 5/16" apart, one or other of these could be used for the pin to afford an accuracy of 1/16" or less.

A control-box 15, fastened to the right-hand bracket 3 by bolts 16 (Figure 5b), and to track by bolt 17, and to ceiling by suspender 18, supports on its upper side a motor 24, and encloses control devices below the motor. A vertical side cover of the box is left off for purposes of Figure 5b.

Alternatively, in Figures 2b and 3, the control-box 15 is bolted under a motor-pan 14, supported by ceiling-suspenders not shown, and by an angle-piece 13' fastened to a strip 13 which fastens to bracket 3 and track 6. In this alternative, control-box 15 remains close to track-bracket 3 with stem 53 (later described) communicating through that bracket, while the motor is set farther away to allow space for clutch assembly.

On the shaft of electric motor 24, a worm 26 is pinned. A gear-bracket 25 is mounted upon the motor as shown; it carries by suitable bearings a gear-shaft 28 to which worm-wheel 27 is pinned. Worm 26 and worm-wheel 27 are in mesh and afford reduction of rotation speed from motor-shaft to gear-shaft.

The drive of door from gear-shaft 28 through drive-shaft 21 is shown in two alternative ways. In Figure 4 a flexible-coupling 29 connects the two shafts with pins 29' and 29" at right-angles. In the event of failure of electric current supply to motor 24, the door may be lifted by hand allowing cables 10 to run frictionally over sheaves 40 aided by counterbalancing springs 11 (Figure 1). The lift required is found to be about 60% greater than a lift with freely turning sheaves, and this is practical with doors of the lighter weights, as for one-car garages, in the rare occasions when power fails. Sheave 40, as shown in Figure 4, seats the cable in a V-groove with two lines of contact. This drive is found to be adequate according to the length of traction afforded to cable 10 by the extent of groove-circumference, related to the diameter of sheave used.

In Figures 2a and 2b, a cable-gripping sheave in two parts 40' and 40" is used. 40' is pinned to shaft 21 through its hub; 40" rides slidably upon shaft 21. The part 40' has a shoulder 41 adjacent to its perimeter upon which cable 10 rides, and a face 42' against which cable 10 may be pressed for frictional drive of cable. The part 40" has a recess into which a part of the shoulder 41 may enter, the extent of entry being determined by the thickness of cable 10. Outward of the recess, part 40" has also a face 42" against which cable 10 may be pressed for frictional drive. Pinned through shaft 21 is a threaded collar 43 surrounded by a compression spring 44 one end of which is in contact with sheave part 40" and the other end of which is in contact with washer 45. Nut 46 and lock-nut 46' on collar 43 may be turned to set up a desired pressure upon sheave-part 40", which pressure transfers to cable 10 between the faces 42' and 42" to afford a frictional grip upon the cable to drive the cable and the door.

With the cable-gripping sheaves a clutch is used to connect the shafts 28 and 21, this clutch being disengaged when door is to be operated by hand, as in case of failure of electric power.

This clutch, Figure 2b, is in three elements, so that it requires no key or keyway for a sliding element 31. An element 30 is pinned to shaft 21. An element 32 is pinned to gear-shaft 28. Element 31, between 30 and 32, slides on gear-shaft 28. Gear-shaft extends a short distance into the bore of element 30 to ensure that elements 30 and 31 are in line. Element 30 has two opposite jaws 30' and 30" to engage a jaw 31' of element 31. Element 31 has another jaw 31" to engage two jaws 32' and 32" of element 32. The jaw 31" is never disengaged from jaws 32' and 32". They embrace more fully when the clutch is disengaged. Element 31 is moved closer to element 32, to the right in Figure 2b, to disengage element 31 from element 30 in throwing "out" the clutch. The clutch is thrown out by a fork 35, about to be observed. The same fork may release the clutch for throw "in," and, when gear-shaft 28 turns, engagement is effected by springs 33, which snap the jaw 31' into engagement with jaws 30' and 30" when jaw 31' comes into register with them. The jaws are slanted to facilitate the throw-out of the clutch. At the closing of the door, the shutting off of current to the motor is timed so as to apply pressure to bring the door tightly down. The momentum of rotor in the motor 24 sets up a heavy pressure upon the clutch, so that if a key were used in shaft 28, or if jaws were used having engaging surfaces precisely parallel to shaft 28, a resistance to disengagement by fork 35 would occur beyond the strength of some users.

Fork 35, Figures 2b and 3, has lugs 35' that extend into an annular groove of clutch element 31. Fork 35 pivots at 36' to bracket 36 mounted on motor 24 at 34, and on motor-pan 14, at 34'. Fork-handle extends through a slot 39 in flange of motor-pan 14, and thus is accessible for manual throw-out of clutch. Fork-latch 38, pivoted at 37, on flange of motor-pan, tends downward upon handle of fork 35, by pull of spring 38", and, when handle is moved to the left of Figure 2b, latch 38 engages the handle to hold the clutch out. A prong 38' in latch 38 extends over the edge of flange of motor-pan 14 and is accessible to be lifted manually to disengage the latch 38 from fork-handle to permit springs 33 to re-engage the clutch.

*Control switches*

Reversing-switch 50, Figures 4, 5b, 22 and 23, is supported by brackets 51 riveted to control-box 15. This switch (see Figure 23, wiring-diagram) has two terminals at one end, 47 and 47', and two at the other end, 48 and 48'. Broken lines 49, Figure 23, represent the direction of flow of current, parallel to sides of switch, when connections within the body of the switch are brought into contact, upon handle 52' being put into the position in which it appears in Figure 23. Dotted lines 49' represent the direction of flow of current, diagonally across the switch, when connections within the body of the switch are brought into contact, upon handle 52' being put into the position opposite to that in which it appears in Figure 23. The interconnections within the body of switch 50 open the circuit of lines 49 when they close the circuit of lines 49', and vice versa. The motor field-leads 172 and 172' are attached to the terminals 48 and 48', and the armature-leads 173 and 173', also the power-supply leads, are attached to the terminals 47 and 47'. To reverse the direction of rotation in a motor, the field-leads are reversed in relation to the armature-leads. This is done through reversing switch 50 by the throwing of the handle 52'. When handle 52' is in the position in which it appears in Figure 23, the effect is the same as if the field-lead 172 were bound at 47 to armature-lead 173, and the field-lead 172' were bound at 47' to armature-lead 173', resulting in the turning of the motor-shaft in a given direction. When the handle 52' is in the position opposite to that in which it appears in Figure 23, the effect is the same as if field-lead 172 were transferred to 47' and there bound to armature-lead 173', and the field-lead 172' were transferred to 47 and there bound to armature-lead 173, resulting in the turning of the motor-shaft in the opposite direction. Red lamp connections 174 and 174' of Figure 23 are explained under the caption Lamps.

To throw the switch 50 mechanically, an extension-handle 52 is provided, riveted to the handle 52' of the switch. A stem 53, at right angles to, and rigidly fixed in, the handle 52, reaches through a hole 54 (Fig. 5b) in both control-box 15 and bracket 3 to engage a shifter 55, pivoted at 57 on bracket 3 (Fig. 5b). Stem 53 passes through a hole or slot 56 punched in the shifter 55. A strike 58, pivotally attached at 59 to shifter 55 for angular adjustment, has a face 58' at a right-angle which reaches out for contact by cable 10, or by finger 65 about to be described. The face 58' extends high enough, as at 58", and may be bent enough, so that finger 65 will not catch the top of it as the door approaches closed position. By the adjustment of strike 58 on shifter 55 to register one of the holes 62 in strike with one of the holes 61 in shifter, the registered position being held by screw 63 through the holes, the strike is adaptable to the timing of required contacts with cable 10 and finger 65 under varying conditions.

Cable 10, attached to the bottom end of door, lifts the door so that the bottom end of door moves rearward at the termination of its opening movement, led by the door's roller in the lower part of the curved section 6 of the track. Thus cable 10 swings into the position 10' as seen in Figure 5b. Upon the cable taking this position it moves shifter 55 rearward, and, with it, the stem 53 and handle 52 of switch 50. This positions the switch to reverse the direction of rotation of motor, and the direction of the next drive upon the door.

To move shifter 55 forward, and with it the stem 53 and handle 52 of switch 50, and again to position the switch to reverse the motor at the termination of door-closing movement, a finger 65 is provided, consisting of a rod threaded at its rearward end to receive adjusting nut 64 and lock-nut 64', sliding in a guide 68 held by supplementary adjusting nuts 69 and 69' to plate 67 bolted to top corner of door as shown, Figures 4 and 5b. Adjustments by nuts provide for the throw of switch 50 to correspond to a required exact stopping of door in fully closed position, under frictional conditions varying at each job in relation to momentum in rotor of motor. A small adjustment at the finger, horizontally of Figure 5b, affects a substantial movement of door vertically, the movement of top of door at nearly closed position being almost vertical. Spring 66, pressing finger 65 as shown, has a strength adequate for moving shifter 55, and switch-handle 52. It yields as the finger is pressed rearward by strike 58 with door moving down to fully closed position.

70 is a power-switch mounted by bracket 71 to control-box 15. Through this power-switch current to the motor 24 is supplied and cut off. To supply current to the motor, handle 72 (Figures 5b and 5c) is moved rearward by solenoid 80, being connected to plunger 80' of solenoid 80 by chain-links 78 and eye bolt 78'. Solenoid 80, riveted to control-box 15, is energized by supply of "house-current" as indicated in wiring-diagram, Figure 22. The circuit to this solenoid is closed by a switch 130 operated by a push-button 133 (Fig. 9), described under caption "Lock," also by a relay 176, the coil of which is energized by any means whether actuated by radio-waves from a car, by sound-waves, by post-lock as later described herein, or by the depression of tire-contact as later described.

Handle 72 is engaged and held rearward by latch 75. Latch 75 is pivoted at 74 on bracket 73 riveted to control-box 15. A spring 77, connected between eye bolt 78' carried by handle 72 and latch 75 as shown, serves the two purposes of pressing latch 75 to engage and hold handle 72 in "on" position, and, when latch 75 is disengaged, of moving handle 72 into "off" position (Figure 5c) in which the supply of current to motor 24 is cut off.

Latch 75 is disengaged by the forward swing of stem 53 when door reaches closed position. An extension 79, riveted to latch 75, has, pivoted to it at 87, a click 86, held normally by spring 88 against stop 89. The click is in the range of swing-through of stem 53, and it is slanted so that when the swing-through is forward (to the right of Fig. 5b), it depresses and releases latch 75 to cut off current supply, but when the swing-through is rearward the click yields against spring 88 to allow stem 53 to pass without depressing latch 75.

*Timer for automatic closing of door*

When door is upward in open position the circuit to the motor 24 is opened for a limited time, after which the circuit is closed for the motor to resume its run and close the door. Thus the door normally is kept closed. To have the door stay open, one would manually shut off the supply of current when door had reached open position.

90 is a switch having a button 90' pressible inward, which button when freed of pressure springs back to its normal outward position. The switch is of a standard make, small in size, thrown by a minute movement of its button, and having the conventional "double-throw" with three terminals for wiring, one common, another connected to one circuit, as to the circuit of motor 24, when the button is freed of pressure, and the third connected to another circuit, as to that of timer 95, when the button is pressed inward. This switch disconnects from one circuit when it connects to the other.

Switch 90 is strapped to a bracket 91 attached to control-box 15. A bracket 92 on the frame has riveted to it a leaf 93 of flat spring-steel which normally is in position for close contact with button 90' when the latter is free of inward pressure. Leaf 93 reaches down to a pawl 100 later described. Timer 95 is supported by bracket 94 fastened to control box 15. Timer 95 is of a standard make, using a synchronous motor and a gear-train to drive its shaft 96 in the direction of the arrow, Figure 5b. A disc 97 is put on shaft 96 by a press-fit. Twelve holes, spaced 30° apart, are threaded in cam-plate 97 to take threaded studs 98. The number of studs used, and the degree of their spacing, determine the time-period utilized. If the timer-shaft rotates at a high speed of one revolution per minute, the time from hole to hole is five-seconds. If four studs were used, spaced 90° apart, they would pass a given point at intervals of 15 seconds. Three studs, 120° apart, would pass at intervals of 20 seconds; two 180° apart at 30 seconds; and one stud at one minute intervals. Thus the cam-plate and its studs admit of variation in the time-period.

In the illustration of Figures 4 and 5b, three studs 98 are used, at 120° spacing. Each stud comes into contact with a pawl 100 to depress the pawl. This pawl at its forward end rides pivotally on stem 53; it is supported and controlled by spring 99 pivotally attached to it and hung from bracket 51. Pawl 100 has a tooth 100' to engage and press leaf 93 rearward to throw the button 90' inward of switch 90. This throw of button 90' occurs when the door reaches open position and stem 53 is moved rearward, and it cuts off current to motor 24 and connects it to the timer motor to actuate the latter.

Upon the actuation of the timer-motor, the cam plate moves in the direction of the arrow, bringing the stud that is above the tip of pawl 100 to move downward to the pawl, and to move the pawl downward to release the leaf 93 and the button 90' of switch 90, this release occurring within a set period of time, and causing switch 90 to cut off current from the timer-motor to stop the latter, and to supply current to the door-drive motor 24, whereupon the door is driven into closed position. Upon the door reaching closed position the pawl 100 is moved forward with stem 53 away from the range of studs 98. The pawl is below one of these studs when the timer is stopped, but upon escaping that stud it is in position to rise. When door again reaches open position and the pawl moves rearward with stem 53, the pawl is held downward by spring 99, clear of leaf 93, until it reaches its fully rearward position shown in Figure 5b in which spring 99 lifts it into place for engagement with leaf 93 and with another stud 98.

Timer cut-out of solenoids

Figures 6 and 7 show an alternative arrangement for throwing off the power-switch, and in connection therewith for applying the timer to open the circuit to the solenoids.

Extension 79 of latch 75 rises (Figure 7) to the level shown for the upper tip of click 86 (Figure 5b). Stem 53, swinging through the arc 53', depresses extension 79 during both the rearward and forward swings-through, thus releasing switch-handle 72 and shutting off the motor when door reaches open position as well as when door reaches closed position. The door then is not self-closing, it stays open until a solenoid-pull occurs to throw current "on" through switch 70, and a timer is not needed for the motor-circuit.

Where the user is limited to close quarters for maneuvering the car in front of the garage, the wheels of the car may pass a number of times over a tire-contact (such as later described), in the surface of the driveway, and, if the solenoid were actuated each time, the door-position, obtained as desired, could be changed back again. So, instead of using switch 90 to open the circuit to the motor, it is used to open the circuit to the solenoids for the period of time set. Accordingly, the terminal of switch 90 described as connected to circuit of motor 24 is, in this alternative arrangement, connected to solenoids 80 and 85.

To the plunger of solenoid 80, a bumper 108 is riveted. When the solenoid plunger moves rearward, this bumper 108 throws arm 101 rearward into the position shown in Figure 7 in which it has moved leaf 93 to press button 90' inward of switch 90, opening the solenoid circuit and closing the circuit to timer 95. Arm 101 pivots as shown on threads of stud 102, and it has a hole into which prong 103 is pressed, this prong being engaged by a latch 105 which pivots on the threads of stud 104 and being disengaged when the timer has moved one of its studs 98 far enough in the direction of the arrow. Timer 95, not being fitted with a brake for accuracy, makes a slight over-run by momentum of its motor after it is shut off, thus enabling its stud 98 to clear the tip of latch 105. Spring 106 serves the double purpose of pulling arm 101 forward, when freed to release leaf 93, and of snapping latch 105 onto prong 103 when arm 101 is moved rearward.

Lock

Figures 8, 9, and 10 show a lock that prevents manual lifting of the door. This lock is released manually by key in door-frame. It is released electrically by solenoid 80, Figures 4 and 5b, through link 81, crank 82, and lifter rod 83, rod 83 appearing also in Figures 9 and 10. The lock is imbedded in door-frame on one side of doorway, Figure 1, midway between sill and lintel.

The lock mechanism is enclosed within a box the several sides of which are (Figure 9): 110, forming the sides and back of the main chamber; 111, forming the sides and back of an upper chamber; 112 and 113, top and bottom respectively; these pieces being riveted together as shown; and removable front covers 114 for the main chamber and 115 for the upper chamber, these covers being held by screws. Two angle-pieces 116, riveted to side-walls, hold the box by screws to the wood of the door-frame. Top view, Figure 8, shows the relative positions of door 1, door-frame 2 cut out to receive the box, and trim 2' through which the lock-cylinder extends for key-control from outside the garage. This view shows also the mounting of a horn 129 on the edge of the door at one side, this horn being engaged by latch 120 when the door reaches its downward or closed position. Latch 120 pivots upon a cross-rod 121 supported on the side walls of 110. It has an extension 120' by the lifting of which it is disengaged from horn 129, the lifting being effected by either solenoid 80 through lifter-rod 83 already observed, or by cam 118 thrown by lock-cylinder 117. The cam is pinned to lock-rod 122 which is supported pivotally on the side walls of 110.

Upon any disengagement of the latch 120, the latch must hold its disengaged position so that the door may be lifted. The disengaged position is held by a catch 123 (pressed by spring 124) upon a boss 120" pressed through a hole in extension 120' and extending from the side of that extension. After the horn 129 lifts with the door to pass its point of engagement by latch 120, it presses a pawl 125 inward of the box. Pawl 125 is supported at one end by a link 126 from cross-rod 121, and at its other end by attachment pivotally to catch 123. Inward movement of the pawl disengages catch 123 and releases latch 120, so that the latter, under pull of spring 127 is positioned to again engage the horn 129 at the next closing of the door. As the door moves downward past the latch 120, it presses the latch inward to a mid-position in which the boss 120" does not reach the point of engagement by the catch 123. Latch 120 thus is free, to move under stress of spring 127 outward for re-engagement with the horn. Spring 127 attaches to extension 120' and to cam 118 as shown, so that it serves the double purpose of repositioning both these parts.

The arrangement in the use of key in cylinder 117 is that, when supply of electric current fails, the door, upon being unlocked as by cam 118 already noted, may be opened manually, and that, while supply of electric current continues, the turning of key sets off the door-operator through prong 119 about to be observed. 130 is an electric switch strapped to the back wall of 110. Its push-button 130' is depressed by a leaf 132 of spring steel riveted to bracket 131 which is riveted to a side wall of 110. Spring pressure within the switch causes the button 130' to recover its outward position when leaf 132 is released. A prong 119 through lock-rod 122 presses leaf 132 and button 130' when lock-cylinder 117 is turned in the direction of the arrow, Figure 9. As shown in wiring-diagram, Figure 22, pressure of button 130' actuates solenoid 80 to set off the door-operator.

In the same wiring diagram it will be observed that the supply of electric current to the whole operator mechanism is brought through a night-lock switch 135. The throwing of switch-handle 135' manually to "off" position cuts off the supply of current and so affords a means of locking the operator from actuation by any setting off means.

From inside the garage, the operator may be set off by manual pressure upon push-button 133 to press leaf 132 against button 130'. In case of failure of electric current supply, the latch 120 may be pressed in manually to allow of manual lifting of the door. If it should be desired to hold the latch 120 out of engagement with horn 129 for an indefinite period, wing-handle 136 may be used to turn cross-rod 121, lifting prong 137, fastened through the cross-rod, to engage under the end 83' of lifter-rod 83 and to lift the latch, with the lifter-rod, to a mid-position limited by dog 138 in which the latch 120 clears the horn 129 though boss 120'' is not engaged by the catch 123. The prong 137 takes its position indicated at 137' in which it is held by dog 138, under pressure of spring 139. The angle of the notch in top end of dog 138, and the strength of spring 139 are such as to permit the release of lifter-rod 83' and the latch 120 by manually returning wing-handle 136 to its position shown in Figure 9.

At solenoid 80, Figure 5b, chain-links 78 have been noted, connecting plunger of solenoid 80 to handle 72 of switch 70. The links allow plunger of solenoid to yield forward under weight of lifter-rod 83 and stress of spring 127. If 78 were a rigid connection, latch extension 120' could be held upward by lifter-rod while switch 70, held by latch 75, kept the motor running. Door then could close fully without becoming locked, for catch 123 would still hold latch 120.

Bar-lock cut-off of supply of electric current

In Figure 1, a locking means appears as customarily used with doors of the kind here illustrated. A handle inside and outside the door turns a disc 143 to move bars 144 and 144' into holes punched in track 5 either side of doorway. The handle is released from outside by a key in a lock, and from inside by a knob on the lock, to permit of withdrawing the bars from the track.

140 is a switch, normally closed, in the circuit of electric current supply. The current supply, according to wiring diagram, Figure 22, flows through this switch before reaching the electrical devices related to door-operation. This switch 140 is mounted on track 5 at one side of doorway. It is thrown to open the circuit whenever the bar 144 is introduced through track 5 to lock the door. Thus no part of the door-operating mechanism may be set into motion while the door is locked by the bars 144 and 144'.

Tire-contact

Figures 11 and 12 show details of a means generally indicated as 150, imbedded in floor as in Figure 1, of closing a low voltage electric circuit by pressure together, under the weight of an automobile wheel, of two strips of metal normally held apart by rubber spacers.

151 is a plank with a rubber base-sheet 152 cemented to its top face. Upon the base-sheet 152 a metal base-strip 153 is cemented. Along either edge of strip 153, partly above such edge and partly above sheet 152, two pad-strips 154, preferably of rubber, are cemented. Between the pad-strips 154, at intervals along the length of the assembly, narrow spacers 156, of the same thickness or height as the pad-strips 154, are cemented over the metal base strip 153 across between the pad-strips 154. These spacers support a metal spring-strip 155, of tempered spring-steel which normally holds in a straight line. The ends of the spring-steel strip 155 are riveted to end-spacers 157 so that the strip 155 does not work out of its position along the middle line of the assembly above the metal base-strip 153. Metal strips 153 and 155 are punched at one end with holes to which are secured electric-wires 158 and 158' from a trench-lay cable entering one end of the plank, puttied to exclude water from the assembly. The splicing of the wires to the metal strips is insulated to prevent normal metal to metal contact by the base-strip 153, and the wire 158 bound to it, with the spring-strip 155 and the wire 158' bound to that. The whole is overlaid by a rubber top-sheet 150' cemented onto the pad-strips 154 and onto the outer surfaces of the base-sheet 152. The rubber construction is such as to prevent the entry of water into the assembly, and is reinforced upon the plank by binding strips 159 held to the plank by screws 159'.

Post-lock

Figures 13, 14, and 15 show a switch on a post 160 outside the garage, as in Figure 1, thrown by a key in a lock.

The horizontal arm 160' carrying lock-head generally indicated as 161 is at a convenient level to be reached from the window of the automobile. The post is located adjacent to the window on the driver's side of the car when the car is headed toward the door. No attention is needed when the car is moving away from the garage at installations in which the door closes automatically by a timer.

Post 160, its arm 160' and its extensions below the ground-level are preferably of pipe and pipe-fittings as shown. Through the pipe the wiring from the lock-switch runs to a trench lay cable 168 that runs under the surface into the garage containing leads 168' and 168''. At the operator mechanism the circuit passes through the relay 176 to energize the solenoid 80, so that the turning of key in lock-cylinder 162 effects a solenoid-pull to set off the operator.

Lock-head 161 is housed by a pipe-cap 161', screwed by bushing 161'' onto the horizontal arm 160'. A hood 169, riveted to the pipe-cap, shields the orifice of the lock-cylinder from rain and ice. A standard lock-cyclinder is used, held by screw thread in the center of the pipe-cap, and anchored against unscrewing by side-screw 163 covered by the hood. The lock-cylinder 162 is held by spring 166 on striker 162' against stop-pin 164 in correct position for insertion and withdrawal of key. Key is turned in the direction of the arrow, Figure 14. Electric switch 165 is strapped to the inside wall of pipe-cap. Between the button 165' of this switch and striker 162' on the cylinder, a rubber arm 167 is hung by a bracket riveted to wall of pipe-cap. Turning of the key presses striker 162' and arm 167 against switch-button 165' to set off the door-operator.

Lamps

Two electric lamps, one green, 170, and one red, 171, shown in Figure 1 within view of the car-driver, are represented in wiring-diagram, Figure 22.

Green lamp 170 is wired in parallel with timer 95 so that it lights while the door holds open position.

Red lamp 171 has one lead 174 bound at switch 50, Figure 23, to terminal 47, and its other lead 174' bound to terminal 48. The handle 52' being in the position in which rotation of motor-shaft is produced in the direction to open the door, the connections 49' are open, affording no path for current from a current-supply wire through terminal 47', so that the red lamp does not light. But when switch-handle 52' is put into the opposite position, to provide for rotation of motor-shaft in the direction to close the door, the circuit through 49' from terminal 47' to terminal 48 is closed, and current flows from 47' through 49' to 48, thence through lead 174', lamp 171, and lead 174, to terminal 47, where contact is made with the other lead from the electric current supply. Thus the red lamp lights during the time through which the motor is driving the door closed.

Safety arrestor and retractor

Figures 16 and 17 show a rubber sleeve 185 looped around the bottom edge of door enclosing two metal strips 186 and 187 which, when brought into contact, close an electric circuit for relay 176 to energize solenoid 85, Fig. 5b. Solenoid 85 is connected by rod 84 to stem 53. The throw of the solenoid moves the stem 53 to set handle 52 of switch 50 into forward position, the position in which the circuit to motor 24 provides for motor rotation to move the door upward.

Rigid horns 181 and 181' of wood or metal, solid on the bottom edge of door at either side, limit the downward movement of the door so as not to bring metal strips 186 and 187 into contact when the door reaches closed position. Metal strip 186 is suspended from these horns by eye-bolts 182 and 182'. At one end turnbuckle 183, between eye-bolt 182 and strip 186, is adjusted to hold strip 186 depending in a curve some distance at midpoint from the bottom edge of door and close to strip 187. Strip 187 is suspended in an approximately straight line near the bottom of loop formed by sleeve 185, which sleeve is fastened to door inside and outside by screws 188 on binding strips 189.

Two insulated wires 184 and 184', such as rubber covered twin lamp-cord, are spliced one to each of the strips 186 and 187. These lead out the side edge of door, thence upward to a reel next described, and are in the circuit of relay 176 so that solenoid 85 may be energized to operate the reversing switch to insure lift of the door.

This is a protective device against the possibility that the door, moving downward, should come into contact with a car or other object. In the alternative practice described under the caption "Timer cut-out of solenoids," this device is designed to bring the motor and door to a stop, since the throw of stem 53 by solenoid 85 throws off the power-switch. In the practice described under the caption "Control switches," in which the motor may be of the kind that is reversible without being brought to a stop, this device is designed to retract the door upward, at which position the timer cycle is re-enacted before the door again moves down. The throw of stem 53 by solenoid 85 reverses the motor.

Some distance of door-movement is allowed by the distance between strip 186 and bottom edge of door within which to arrest the downward movement of door before the rigid bottom of door may reach the car.

The sleeve 185 serves also as a weather strip.

An alternative safety arrestor and retractor is shown in Figures 18 and 19. The rubber sleeve 185' encloses a rubber hose 177 that is plugged at both ends by plugs 177' and 177" and has an air-tube 178, through the plug 177' at one end, communicating into an air-chamber 179 which has a diaphragm 179' sealed to it. The diaphragm is in contact with a handle 180' of a normally open electric switch 180 that is in the circuit described for strips 186 and 187. The closing of the switch has the same effect as described for the bringing into contact of the strips 186 and 187. The switch is closed by air-compression within the hose pressing diaphragm 179' to move switch-handle 180' when the door moves down against a car or other object. This design has the advantage that with it a door cannot be caused to move upward by lifting with one's hands under the sleeve 185' from outside: a greater air-compression being required to actuate switch 180 than may be set up by the hands.

*Reel*

Figures 20 and 21 show a reel that automatically takes up the slack in electric cord 184 and 184' as the door rises. This is of value not only for wires from a safety-arrestor such as above described, but for any electric circuit from a device mounted on a movable door to a device mounted on a stationary support. Such a device mounted on the door might be an electric-ear at the level of a sound-producing device on an automobile.

The electrically insulated cords 184 and 184' rise vertically from the bottom corner of door in about the line taken by cable 10. Above sheave 40 they continue vertically to the reel.

The reel is mounted by bracket 191 on door-frame above, and clear of, sheave 40. Two metal discs 190 and 190' form the walls of the reel. These are spaced apart by sleeves 192 on rivets 192'. The sleeves afford a bearing upon which the cord 184—184' may be wound. The disc and sleeve assembly revolves upon a spindle 193 journaled in bracket 191. It is caused to revolve clockwise of Figure 20, and thus to wind up cord, by a spiral spring 199 of flat spring-steel riveted to disc 190' by bracket 190", and to spindle 193 by rivet 193'. Spiral spring 199 is wound to desired tension by winder 198 which at one end goes through a hole in spindle 193, and at the other end, after the winding, is introduced through a hole 191' in the bracket 191. Spiral spring 199 is confined from sidewise discharge by a cap 197 riding on spindle 193 and extending to sleeves 192.

Disc 190 is insulated from the rest of the assembly so that current from the insulated cord 184 soldered to it may be carried through it to a brush 194 at its periphery, while current from cord 184', soldered to disc 190', runs through the remainder of the assembly to a ground-terminal 194' riveted to bracket 191. Disc 190 is insulated at each sleeve and rivet by three washers of fiber, one core-washer 195 within a hole through disc 190 embracing rivet 192', and two washers 195' of greater outside diameter than core-washer 195, either side of the disc and the core-washer. At the spindle, disc 190 is insulated by a square fiber bearing 196 riveted to it having a hole by which it turns freely on the spindle. Brush 194, of flat spring-steel is held to the bracket and insulated therefrom by three layers of fiber 194', Figure 20, and four rivets. All four rivets go through the middle layer, but the two that hold the brush do not touch the two that hold to the bracket. The two wires from brush and from ground terminal are in the circuit of relay 176 to control solenoid 85, for the purpose already observed.

The reel operates to wind up and hold the insulated wire cord that without it would hang slack and uncontrolled as the door moves upward; and it operates to pay off cord as the door moves downward, and it serves to transmit current from the cord to a stationary circuit.

*Low voltage circuit*

So that persons may not be exposed to high voltage current in the event that the rubber surface of tire-contact or the rubber sleeve on door might be torn loose, the circuits to these devices, and for convenience to the post-switch, is stepped down by a transformer 175, Figures 4 and 5b and 22, to a low voltage. Upon the closing of the circuit, the low voltage current energizes the coil of a relay 176 and the relay closes the higher voltage circuit to solenoids 80 and 85.

*Solenoids*

The two solenoids 80 and 85 pull in opposite directions, though both are energized at the same time. But they do not conflict. Solenoid 85 actuates only the switch handle 52 and stem 53 to set them forward in position in which switch 50 causes motor 24 to rotate for the opening of the door. If the door is fully open, solenoid 85 is resisted by the inertia of the door pressing cable 10 against shifter 55 and stem 53, so that it does not throw switchhandle 52. Thus, incidentally it may be noted, solenoid 85 cannot release leaf 93 before timer 95 has made its full run and is positioned for another full run when next actuated. If the door is fully closed, switch handle 52 will have moved the plunger of solenoid 85 inward so that any energizing of that solenoid is of no effect. Solenoid 85 thus works only when the door is partly closed, and in that situation it is desirable for retracting the door that the other solenoid 80, energized at the same times as solenoid 85, will have the power switch on. Solenoid 80 throws power-switch 70, and is in no way connected to handle 52 of switch 50.

Operation

The detailed operation of each of the devices has been observed under its caption. A general view of operation may be had, as in the case of a door-operator at the garage of an apartment house. The driver of an automobile approaches the doorway and finds the door closed. He stops beside the switch-lock on post 160. He turns a key in the lock, closing the circuit to solenoid 80 which throws handle of power-switch 70 to turn current on. The door, when previously it reached closed position, threw handle 52 forward at reversing switch 50, through finger 65 on plate 66, so that, with current now turned on, the motor drives shaft 21 to raise door to upward position. The green lamp shines, and driver passes into the garage. Upon the door reaching upward position, cable 10 moves shifter 55 to throw handle 52 of reversing switch rearward, the position in which the circuit to motor will cause motor to drive door downward to close. But motor 24 cannot yet go into action, for the throw of switch handle 52 produces the throw of switch 90 to open the circuit to motor 24. The same throw of switch 90 closes the circuit to timer 95 to rotate cam-plate 97, delaying, through the set time-period, the release of leaf 93, and the closing of the circuit to motor 24. Upon the closing of the circuit to motor 24, the green lamp goes off, and the red lamp lights, while motor 24 drives the door downward. On reaching closed position the finger 65 on plate 66 throws shifter 55 forward throwing power-switch off through dog 87 and stopping the motor and the door. No door movement then ensues until the operator is again set off.

If, while door is closing, the tire of a car approaching from inside the garage passes over the tire-contact, or the key of a driver outside the garage is turned in post-lock, or the safety arrestor and retractor comes into contact with a car or other object, relay 176 is closed and solenoid 85 is energized to throw the reversing switch, the direction of rotation of motor is reversed, and the door is brought back to upward position. The green light again goes on and the timer again goes through its run; after which the motor resumes its closing drive upon the door.

I claim:

1. In combination, an overhead door, vertical, horizontal and curved interconnecting guide tracks at the side of the door for guiding the door between vertical or closed position and overhead horizontal or open position, pulleys above the vertical tracks, door counter-balancing means to the rear of the pulleys, cables connecting the counter-balancing means and the bottom of the door and passing about the pulleys, an electric motor drivingly connected with the pulleys to shift the cables and the door, a reversing switch in the motor circuit, a normally open, solenoid operated main switch, latch means for holding the main switch closed after closing by the solenoid, a remote control switch for momentarily closing the solenoid circuit to start the motor, and devices actuated by the door as it approaches closed position which release the latch of the main switch and shift the reversing switch to condition the motor circuit for a subsequent door opening movement upon reenergizing the motor.

2. The combination of claim 1, wherein the reversing switch has a door operated oscillatory arm engageable with the main switch latch to release the same.

3. The combination of claim 1, wherein the reversing switch has an oscillatory arm and the door actuated devices include a swingable link pivoted above the door and operably connected with the reversing switch arm to actuate it, and a camming member secured to the top of the door and engageable with the link to swing it and the reversing arm.

4. The combination of claim 1, having a second latch which normally prevents opening of the door from the fully closed position and having means operable by the solenoid for the main switch for releasing the second latch and holding it released so long as the main switch is latched closed.

5. In combination, an overhead door, vertical, horizontal and curved interconnecting guide tracks at the side of the door for guiding the door between vertical or closed position and overhead horizontal or open position, pulleys above the vertical tracks, door counter-balancing means to the rear of the pulleys, cables connecting the counter-balancing means and the bottom of the door and passing about the pulleys, an electric motor drivingly connected with the pulleys to shift the cables and the door, a reversing switch in the motor circuit and provided with an oscillatory operating arm, a normally open, solenoid operated main switch, latch means for holding the main switch closed after closing by the solenoid, a remote control switch for momentarily closing the solenoid circuit to start the motor, a horizontally adjustable finger secured to the door and carried above the door, a link shiftable by the finger and coupled to the reversing switch to shift it to condition the motor circuit for a subsequent door opening movement, and means to depress the main switch latch during the shift of the reversing switch arm.

6. In combination, an overhead door, vertical, horizontal and curved interconnecting guide tracks at the sides of the door for guiding the door between vertical or closed position and overhead horizontal or open position, pulleys above the vertical tracks, door counter-balancing means to the rear of the pulleys, cables connecting the counter-balancing means and the bottom of the door and passing about the pulleys, the cables being substantially vertical when the door is closed and sloping rearwardly when the lower end of the door is raised to be in the curved portion of the guides, an electric motor drivingly connected with the pulleys to shift the cable and the door, a reversing switch in the motor circuit, a normally open, solenoid operated main switch, latch means for holding the main switch closed after closing by the solenoid, a remote control switch for momentarily closing the solenoid circuit to start the motor, and devices actuated by the cable as the door approaches fully open position which release the latch of the main switch and shift the reversing switch to condition the door for a subsequent door closing movement upon reenergizing the motor.

7. The combination of claim 6, wherein the reversing switch has an oscillatory arm engageable with the latch of the main switch, and having an arm operating link engageable by the cable.

8. In combination, an overhead door, vertical, horizontal and curved interconnecting guide tracks at the sides of the door for guiding the door between vertical or closed position and overhead horizontal or open position, pulleys above the vertical tracks, door counter-balancing means to the rear of the pulleys, cables connecting the counter-balancing means and the bottom of the door and passing about the pulleys, the cables being substantially vertical when the door is closed and sloping rearwardly when the lower end of the door is raised to be in the curved portion of the guides, an electric motor drivingly connected with the pulleys to shift the cable and the door, a reversing switch in the motor circuit, a normally open, solenoid operated main switch, latch means for holding the main switch closed after closing by the solenoid, a remote control switch for momentarily closing the solenoid circuit to start the motor, devices actuated by the door as it approaches closed position which release the latch of the main switch and shift the reversing switch to condition the motor circuit for a subsequent door opening movement upon reenergizing the motor, and devices actuated by the cable as the door approaches fully open position which release the latch of the main switch and shift the reversing switch to condition the door for a subsequent door-closing movement upon reenergizing the motor.

9. In combination, an overhead door, vertical, horizontal and curved interconnecting guide tracks at the side of the door for guiding the door between vertical or closed position and overhead horizontal or open position, pulleys above the vertical tracks, door counter-balancing means to the rear of the pulleys, cables connecting the counter-balancing means and the bottom of the door and passing about the pulleys, an electric motor drivingly connected with the pulleys to shift the cable and the door, a reversing switch in the motor circuit, a normally open, solenoid operated main switch, latch means for holding the main switch closed after closing by the solenoid, a solenoid in parallel with the first solenoid for operating the reversing switch to position it for raising the door, a remote control switch for momentarily closing the solenoid circuits to start the motor, devices actuated by the door as it approaches closed position which release the latch of the main switch and shift the reversing switch to condition the door for a subsequent door opening movement upon reenergizing the motor, and a door-carried switch operable when the door is moving toward closed position which reenergizes the solenoids and causes the reversing switch to reverse the motor and open the door.

10. In combination, an overhead door, vertical, horizontal and curved interconnecting guide tracks at the sides of the door for guiding the door between vertical or closed position and overhead horizontal or open position, pulleys above the vertical tracks, door counter-balancing means to the rear of the pulleys, cables connecting the counter-balancing means and the bottom of the door and passing about the pulleys, the cables being substantially vertical when the door is closed and sloping rearwardly when the lower end of the door is raised to be in the curved portion of the guides, an electric motor drivingly connected with the pulleys to shift the cable and the door, a main switch for the motor spring biased to open position, a main switch closing solenoid responsive to momentary energization to close the main switch, a spring biased latch holding the main switch closed, a reversing switch in the motor circuit, a shiftable reversing switch operator which when shifted from one position to the other acts on the main switch latch to release it, mechanism operable by the door upon approach of the door to fully closed position to shift the reversing switch operator and release the latch and operated by the cable upon approach of the door to fully open position to shift the reversing switch operator and release the latch.

11. The combination of claim 10, having a second solenoid acting when energized to shift the reversing switch to the door-opening position, and a normally open, door-carried switch which when closed during the closing movement of the door energizes the second solenoid to reverse the motor and open the door.

12. A door controller comprising an electric motor drivingly connected with a door to shift it between open and closed positions, a reversing switch for controlling the direction of motor operation, a normally open main switch in series with the motor, a main switch-operating solenoid for closing the main switch, a latch for holding the main switch closed, the latch and reversing switch being interconnected for concurrent shift of latch to release the main switch and of the reversing switch to the other position, and door-operated means effective upon approach by the door to fully open position to unlatch the main switch and shift the reversing switch and condition the motor circuit for a door closing operation.

13. A door controller comprising an electric motor drivingly connected with a door to shift it between open and closed positions, a reversing switch for controlling the direction of motor operation, a normally open main switch in series with the motor, a main switch-operating solenoid for closing the main switch, a latch for holding the main switch closed, the latch and reversing switch being interconnected for concurrent shift of latch to release the main switch and of the reversing switch to the other position, door-operated means effective upon approach by the door to fully open position to unlatch the main switch and shift the reversing switch and condition the motor circuit for a door closing operation, a second solenoid connected in parallel with the first and operably connected to the reversing switch to shift the reversing switch toward door-opening position only, the second solenoid when energized having insufficient power to overcome the main switch closing effort of the first solenoid.

14. A door controller comprising an electric motor drivingly connected with a door to shift it between open and closed positions, a reversing switch for controlling the direction of motor operation, a normally open main switch in series with the motor, a main switch-operating solenoid for closing the main switch, a latch for holding the main switch closed, the latch and reversing switch being interconnected for concurrent shift of latch to release the main switch and of the reversing switch to the other position, door-operated means effective upon approach by the door to fully open position to unlatch the main switch and shift the reversing switch and condition the motor circuit for a door closing operation, and an electrically operated timer automatically set into operation when the reversing switch is shifted to door-closing position for reenergizing the motor to close the door.

15. A system of controls for a motor for operating a door between open and closed positions, comprising an alternating current power source, a reversing switch which controls the direction of rotation of the motor and of door movement, means for shifting the reversing switch near the opening and the closing movements of the door to condition the motor circuit for reverse operation, a normally open main switch in series with the motor, latch means to hold the main switch closed, a relay energizable from the power source to close a contact which connects the main switch to the power source, a main switch closing solenoid coil energized when the relay is closed, whereby upon momentary closing of the relay, the coil is energized and the main switch closed and latched closed, and means operated by the reversing switch operating means to unlatch the main switch and deenergize the motor.

16. A system of controls for a motor for operating a door between open and closed positions, comprising an alternating current power source, a reversing switch which controls the direction of rotation of the motor and of door movement, means for shifting the reversing switch near the opening and the closing movements of the door to condition the motor circuit for reverse operation, a normally open main switch in series with the motor, latch means to hold the main switch closed, a relay energizable from the power source to close a contact which connects the main switch to the power source, a main switch closing solenoid coil energized when the relay is closed, whereby, upon momentary closing of the relay, the coil is energized and the main switch closed and latched closed, means operated by the reversing switch-operating-means to unlatch the main switch and deenergize the motor, and an electromagnetic reversing switch operator in parallel with the main switch operating coil and operable to shift the reversing switch from door-closing position to door-opening position upon closing of the relay circuit while the door is moving toward closed position.

17. The combination with an overhead garage door, vertical and horizontal door guides, door counter-balancing means, a cable connecting the counter-balancing means with each side of the door and shouldered guide pulleys above the doorway about which the cables pass, a drive shaft connecting the pulleys to cause them to revolve in unison, means carried by the shaft adjacent each pulley and pressed against the side of the adjacent cable to increase the friction between the cable and pulley, and an electric motor drivingly connected with the shaft to revolve the shaft and parts carried thereby, the driving connections between the motor and the pulley carrying shaft including a motor driven shaft aligned with the pulley carrying shaft and carrying a clutch member with spaced jaws for driving in either direction, a second clutch member in the pulley shaft with spaced jaws for driving in either direction, a third clutch member slidable along the motor driven shaft and spring biased toward the clutch member on the pulley shaft, a manually operable clutch shifter for separating the third clutch member from the first, the third clutch member having a jaw which at all times is drivingly connected with the jaws of the second clutch member.

18. In combination, an overhead garage door, vertical and horizontal door guides, door counterbalancing means, a cable connecting the counterbalancing means with the door, a cable drive pulley having a side face against which the cable bears, a power-driven drive shaft for the pulley, a cable-engaging disc slidable on and drivingly connected to the shaft, shaft-carried spring pressure means for pressing the disc against the other side of the cable to thereby increase the friction between the cable and pulley and augment the driving force transferred to the cable from the pulley, and a manually releasable driving connection between the pulley drive shaft and the motor for disconnecting the drive shaft from the motor for manual operation of the door.

References Cited in the file of this patent

UNITED STATES PATENTS

| | | |
|---|---|---|
| 1,131,832 | Gleason | Mar. 16, 1915 |
| 1,370,111 | Jackson | Mar. 1, 1921 |
| 1,725,963 | Morris | Aug. 27, 1929 |
| 1,745,990 | Goldman | Feb. 4, 1930 |
| 1,775,755 | Forman | Sept. 16, 1930 |
| 1,874,903 | Conway | Aug. 30, 1932 |
| 1,906,677 | Waldman | May 2, 1933 |
| 1,915,422 | Johnson | June 27, 1933 |
| 1,928,698 | Morris | Oct. 3, 1933 |
| 1,935,017 | Carpre | Nov. 14, 1933 |
| 2,001,416 | Frezzolini | May 14, 1935 |
| 2,048,514 | Peelle | July 21, 1936 |
| 2,221,216 | Greegor et al. | Nov. 12, 1940 |
| 2,401,082 | Konter | May 28, 1946 |
| 2,542,432 | Riverman | Feb. 20, 1951 |
| 2,558,032 | Andrews | June 26, 1951 |
| 2,572,785 | Vaughn | Oct. 23, 1951 |
| 2,588,879 | Richards | Mar. 11, 1952 |
| 2,607,586 | Schlytern | Aug. 19, 1952 |
| 2,703,235 | Reamey | Mar. 1, 1955 |